(12) United States Patent
Zha (10) Patent No.: US 12,164,714 B2
(45) Date of Patent: Dec. 10, 2024

(54) TOUCH DISPLAY PANEL AND DISPLAY DEVICE

(71) Applicant: TCL CHINA STAR OPTOELECTRONICS TECHNOLOGY CO., LTD., Shenzhen (CN)

(72) Inventor: Bao Zha, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/614,101

(22) PCT Filed: Nov. 5, 2021

(86) PCT No.: PCT/CN2021/128932
§ 371 (c)(1),
(2) Date: Nov. 24, 2021

(87) PCT Pub. No.: WO2023/070729
PCT Pub. Date: May 4, 2023

(65) Prior Publication Data
US 2024/0028145 A1  Jan. 25, 2024

(30) Foreign Application Priority Data

Oct. 28, 2021 (CN) .......................... 202111262878.9

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/134381* (2021.01); *G02F 1/136286* (2013.01); *G06F 3/044* (2013.01)

(58) Field of Classification Search
CPC ........... G02F 1/13338; G02F 1/134381; G02F 1/136286; G06F 3/0412
See application file for complete search history.

(56) References Cited

U.S. PATENT DOCUMENTS

| | | | |
|---|---|---|---|
| 2018/0188584 A1* | 7/2018 | Yeh | ........................ G02F 1/1337 |
| 2020/0363907 A1 | 11/2020 | Heo et al. | |
| 2022/0206327 A1* | 6/2022 | Gong | .................. G06F 3/04184 |

FOREIGN PATENT DOCUMENTS

| | | |
|---|---|---|
| CN | 104850268 A | 8/2015 |
| CN | 105094437 A | 11/2015 |

(Continued)

OTHER PUBLICATIONS

PCT International Search Report for International Application No. PCT/CN2021/128932, mailed on Jun. 30, 2022, 7pp.

(Continued)

*Primary Examiner* — Paisley L Wilson
(74) *Attorney, Agent, or Firm* — The Roy Gross Law Firm, LLC; Roy Gross (57) ABSTRACT

The present disclosure discloses a touch display panel and a display device. The touch display panel includes a first substrate and a second substrate arranged opposite to each other. The first substrate includes a first base and a first common electrode arranged on the first base. The first common electrode is reused as a touch electrode. The second substrate includes a second base and a second common electrode. The second common electrode is arranged over an entire surface of one side of the second base close to the first (Continued)

base. One surface of the first substrate away from the second substrate is a display surface.

13 Claims, 8 Drawing Sheets

(51) Int. Cl.
*G02F 1/1343* (2006.01)
*G02F 1/1362* (2006.01)
*G06F 3/044* (2006.01)

(56) References Cited

FOREIGN PATENT DOCUMENTS

| CN | 106773191 A | | 5/2017 |
|---|---|---|---|
| CN | 108628047 A | | 10/2018 |
| CN | 110362235 A | * | 10/2019 |
| CN | 111273492 A | | 6/2020 |
| CN | 111308804 A | | 6/2020 |
| CN | 111443511 A | | 7/2020 |
| CN | 111708237 A | | 9/2020 |
| CN | 212586865 U | | 2/2021 |
| CN | 112732122 A | | 4/2021 |
| CN | 213023844 U | | 4/2021 |
| CN | 112860117 A | | 5/2021 |
| CN | 112905053 A | | 6/2021 |
| CN | 213750597 U | | 7/2021 |
| CN | 113867564 A | | 12/2021 |

OTHER PUBLICATIONS

PCT Written Opinion of the International Search Authority for International Application No. PCT/CN2021/128932, mailed on Jun. 30, 2022, 8pp.
Chinese Office Action issued in corresponding Chinese Patent Application No. 202111262878.9, dated Jan. 27, 2024, pp. 1-10, 20pp.

* cited by examiner

TOUCH DISPLAY PANEL AND DISPLAY DEVICE

CROSS REFERENCE TO RELATED APPLICATIONS

This application is a National Phase of PCT Patent Application No. PCT/CN2021/128932 having International filing date of Nov. 5, 2021, 2021, which claims the benefit of priority of Chinese Patent Application No. 202111262878.9, filed Oct. 28, 2021, the contents of which are all incorporated herein by reference in their entirety.

FIELD OF INVENTION

The present disclosure relates to the field of display technology, and specifically to a touch display panel and a display device.

BACKGROUND OF INVENTION

With the development of display technologies, more and more functions are integrated in the display device, which enables the display device to implement new functions. Display devices with a touch function have been widely used in people's lives and work, and display panels with a touch function have become a research hotspot in the display field.

SUMMARY OF INVENTION

Technical Problem

At present, small-sized display devices such as mobile phones adopt a touch function. The touch structures of conventional touch display panels include an external touch structure, a touch on cell structure, and a touch in cell structure. The In-cell structure has a thin module thickness and high signal-to-noise ratio, but this touch method is mainly used in the display modes of in-plane switching (IPS) and fringe-field switching (FFS). In the vertical alignment (VA) display mode, the color filter side has a common electrode provided on the entire surface, which has a shielding effect on touch and reduces the signal-to-noise ratio.

Technical Solution

The present disclosure provides a touch display panel and a display device to solve the technical problem in the prior art that the common electrode provided on the entire surface of the touch display panel reduces the touch signal-to-noise ratio.

The present disclosure provides a touch display panel, including:
  a first substrate, wherein the first substrate includes a first base and a first common electrode, the first common electrode is arranged on the first base, and the first common electrode is reused as a touch electrode; and
  a second substrate, arranged opposite to the first substrate, wherein the second substrate includes a second base and a second common electrode, and the second common electrode is arranged over an entire surface of one side of the second base close to the first base,
  wherein one surface of the first substrate away from the second substrate is a display surface.

Optionally, in some embodiments of the present disclosure, the first substrate further includes a touch wiring, the touch wiring and the first common electrode are located in different layers, and the touch wiring and the corresponding first common electrode are connected through a via hole.

Optionally, in some embodiments of the present disclosure, the first substrate further includes a first metal layer, the first metal layer is arranged on one side of the first base close to the second base, the first metal layer includes a gate, and the first common electrode is arranged in the same layer as the first metal layer.

Optionally, in some embodiments of the present disclosure, the first substrate further includes a gate insulating layer, an active layer, and a second metal layer stacked on the first metal layer in sequence; and
  the second metal layer includes a source and a drain, and the touch wiring is arranged in the same layer as the second metal layer.

Optionally, in some embodiments of the present disclosure, the first substrate further includes a passivation layer and a pixel electrode layer; and
  the pixel electrode layer includes a pixel electrode and a connection wiring, the passivation layer includes a first via hole and a second via hole, the first via hole is formed through the passivation layer and the gate insulating layer and exposes a side surface of the first common electrode away from the first base, the second via hole is formed through the passivation layer and exposes a side surface of the touch wiring away from the first base, and the connection wiring connects the first common electrode and the touch wiring together through the first via hole and the second via hole.

Optionally, in some embodiments of the present disclosure, the gate insulating layer includes a third via hole, the third via hole is formed through the gate insulating layer and exposes a side surface of the first common electrode away from the first base, and the touch wiring is connected to the first common electrode through the third via hole.

Optionally, in some embodiments of the present disclosure, the touch display panel includes a plurality of sub-pixels, each of the sub-pixels includes a pixel electrode, and in a first direction, each pixel electrode includes a first end and a second end arranged opposite to each other;
  the first common electrode includes a first sub-electrode and a second sub-electrode, both the first sub-electrode and the second sub-electrode extend in a second direction, the second direction intersects the first direction, the first sub-electrode is arranged corresponding to the first end, and the second sub-electrode is arranged corresponding to the second end; and
  in the second direction, a plurality of adjacent sub-pixels share the same first common electrode, and in the first direction, a plurality of adjacent first common electrodes are connected to the same touch wiring.

Optionally, in some embodiments of the present disclosure, the first common electrode further includes at least one third sub-electrode, the third sub-electrode extends along the first direction and is staggered from the pixel electrode, one end of the third sub-electrode is connected to the first sub-electrode, and an other end of the third sub-electrode is connected to the second sub-electrode.

Optionally, in some embodiments of the present disclosure, the first common electrode further includes a fourth sub-electrode and a fifth sub-electrode; and
  the pixel electrode includes a first stem portion and a second stem portion, the first stem portion extends along the first direction, the second stem portion extends along the second direction, the fourth sub-electrode is arranged corresponding to the first stem portion, and the fifth sub-electrode is arranged corresponding to the second stem portion.

Optionally, in some embodiments of the present disclosure, a planar structure of the touch electrode is rectangular, the touch electrode has a first side length and a second side length, and the first side length and the second side length both range from 2 mm to 9 mm.

Optionally, in some embodiments of the present disclosure, the first substrate further includes a plurality of transparent auxiliary electrodes, and the transparent auxiliary electrodes are connected to the corresponding first common electrodes.

Optionally, in some embodiments of the present disclosure, the transparent auxiliary electrode is located between the first common electrode and the first base, and an orthographic projection of the first common electrode on the first base is located within an orthographic projection of the transparent auxiliary electrode on the first base.

Optionally, in some embodiments of the present disclosure, the transparent auxiliary electrode and the first common electrode are arranged in the same layer.

Optionally, in some embodiments of the present disclosure, the touch display panel includes a plurality of sub-pixels, each of the sub-pixels includes a pixel electrode and two first common electrodes spaced apart from each other; and in a first direction, each pixel electrode includes a first end and a second end arranged opposite to each other, wherein one of the first common electrodes is arranged corresponding to the first end, the other of the first common electrodes is arranged corresponding to the second end, and the two first common electrodes are connected by the transparent auxiliary electrode.

Optionally, in some embodiments of the present disclosure, each of the touch electrodes includes a plurality of first common electrodes; and a plurality of first common electrodes are connected to the same touch wiring in the first direction, every two adjacent first common electrodes are connected to the same touch wiring in the second direction, and the second direction intersects the first direction.

Optionally, in some embodiments of the present disclosure, the touch display panel includes a display mode and a touch mode; and when the touch display panel is in the display mode, the first common electrode is connected to a common electrode driving signal, and when the touch display panel is in the touch mode, the first common electrode is connected to a touch driving signal.

Correspondingly, the present disclosure also provides a display device, including a touch display panel and a backlight module, wherein the touch display panel includes:

a first substrate, wherein the first substrate includes a first base and a first common electrode, the first common electrode is arranged on the first base, and the first common electrode is reused as a touch electrode; and a second substrate, arranged opposite to the first substrate, wherein the second substrate includes a second base and a second common electrode, and the second common electrode is arranged over an entire surface of one side of the second base close to the first base, wherein one surface of the first substrate away from the second substrate is a display surface; and the backlight module is arranged on one side of the second substrate away from the first substrate.

Optionally, in some embodiments of the present disclosure, the first substrate further includes a touch wiring, the touch wiring and the first common electrode are located in different layers, and the touch wiring and the corresponding first common electrode are connected through a via hole.

Optionally, in some embodiments of the present disclosure, the first substrate further includes a first metal layer, the first metal layer is arranged on one side of the first base close to the second base, the first metal layer includes a gate, and the first common electrode is arranged in the same layer as the first metal layer.

Optionally, in some embodiments of the present disclosure, the first substrate further includes a plurality of transparent auxiliary electrodes, and the transparent auxiliary electrodes are connected to the corresponding first common electrodes.

Beneficial Effects

The present disclosure provides a touch display panel and a display device. The touch display panel includes a first substrate and a second substrate arranged opposite to each other. The first substrate includes a first base and a first common electrode. The first common electrode is arranged on the first base. The first common electrode is reused as a touch electrode. The second substrate includes a second base and a second common electrode. The second common electrode is arranged over an entire surface of one side of the second base close to the first base. In the present disclosure, by reusing the first common electrode as the touch electrode so as to integrate the touch electrode in the touch display panel, the thickness of the touch display panel can be reduced. In addition, in the present disclosure, the surface of the first substrate away from the second substrate is configured as the display surface, i.e., the human-machine interaction process occurs on the side of the first substrate away from the second substrate, so as to avoid the shielding interference on the touch electrode caused by the second common electrode designed over the entire surface, thereby improving the touch signal-to-noise ratio and sensitivity.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art may still derive other accompanying drawings according to such accompanying drawings without creative efforts.

DETAILED DESCRIPTION OF PREFERRED EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

In the description of the present disclosure, it should be understood that, terms "first" and "second" are used merely for description, and shall not be construed as indicating or implying relative importance or implying a quantity of indicated technical features. Therefore, features defined by "first" and "second" may explicitly or implicitly include one or more of the features. Therefore, such terms should not be construed as a limitation to the present disclosure.

The present disclosure provides a touch display panel and a display device, and detailed descriptions are provided below. It is to be noted that the description sequence of the following embodiments is not intended to limit preference orders of the embodiments of the present disclosure.

Figure 1:
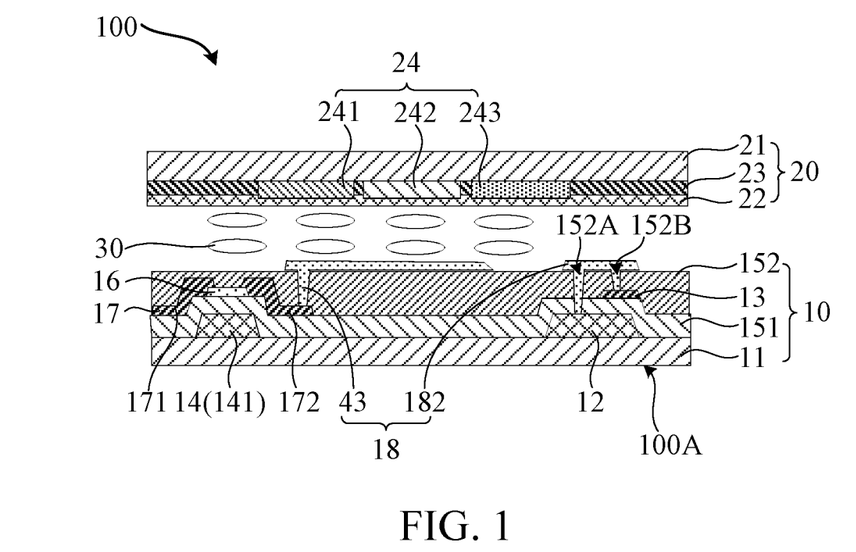
FIG. 1 is a schematic structural diagram of a touch display panel according to a first embodiment of the present disclosure.

Referring to FIG. 1, FIG. 1 is a schematic structural diagram of a touch display panel according to a first embodiment of the present disclosure. In the present disclosure, the touch display panel 100 includes a first substrate 10 and a second substrate 20. The first substrate 10 includes a first base 11 and a first common electrode 12. The first common electrode 12 is arranged on the first base 11. The first common electrode 12 is reused as a touch electrode. The second substrate 20 is arranged opposite to the first substrate 10. The second substrate 20 includes a second base 21 and a second common electrode 22. The second common electrode 22 is arranged over an entire surface of one side of the second base 21 close to the first base 11. One surface of the first substrate 10 away from the second substrate 20 is a display surface 100A.

The first substrate 10 is an array substrate. The first common electrode 12 is a common electrode on the array side. The second substrate is a color filter substrate. The second common electrode is a common electrode on the color filter side.

The touch display panel 100 is a VA liquid crystal touch display panel. In the VA liquid crystal touch display panel, the second common electrode 22 does not need to be patterned. Therefore, the second common electrode 22 is arranged on an entire surface of the first base 21. It can be understood that when the surface of the second substrate 20 away from the first substrate 10 is the display surface 100A, an external touch signal needs to be transmitted to the first common electrode 12 through the second common electrode 22. Therefore, the second common electrode 22 arranged on the entire surface has a signal shielding effect, interferes with the touch signal and reduces the signal-to-noise ratio.

In addition, in the present disclosure, the surface of the first substrate 10 away from the second substrate 20 is configured as the display surface 100A, i.e., the human-machine interaction process occurs on the side of the first substrate 10 away from the second substrate 20. In this way, the touch display panel 100 avoids the shielding interference on the first common electrode 12 caused by the second common electrode 22 arranged on the entire surface during touch sensing, thereby improving the touch signal-to-noise ratio and sensitivity. In addition, in the present disclosure, by reusing the first common electrode 12 as the touch electrode so as to integrate the touch electrode in the touch display panel 100, the thickness of the touch display panel 100 can be reduced, which helps achieve the lightweight and thin structure of the touch display panel 100 and reduces production costs.

In the present disclosure, the touch display panel 100 includes a display mode and a touch mode. When the touch display panel 100 is in the display mode, the first common electrode 12 is connected to a common electrode driving signal, so that the touch display panel 100 performs normal display. When the touch display panel 100 is in the touch mode, the first common electrode 12 is connected to a touch driving signal, so that the first common electrode 12 is reused as a touch electrode. Specifically, according to the touch display panel 100, the first common electrode 12 can be reused as a touch electrode in a vertical blanking period between adjacent frames, so that the displaying of an image on the touch display panel 100 is not affected.

In the present disclosure, the first substrate 10 further includes a touch wiring 13. The touch wiring 13 and the first common electrode 12 are located in different layers. The touch wiring 13 and the corresponding first common electrode 12 are connected through a via hole, so as to realize the transmission of the touch signal.

It can be understood that the touch display panel 100 provided in the present disclosure is of a self-capacitive control type. Self-capacitive touch is based on the current induction of the human body, and is a touch mode of detecting a touch signal through the combination of electrodes and the characteristics of the human body. When the human body (finger) touches the screen of the touch display panel 100, a coupling capacitance is formed between the finger and the first common electrode 12 due to the electric field of the human body, which causes the capacitance of the first common electrode 12 to change. The position touched by the finger can be determined according to the change of the capacitance.

Still referring to FIG. 1, in the present disclosure, the first substrate 10 further includes a first metal layer 14. The first metal layer 14 is arranged on one side of the first base 11 close to the second base 21. The first metal layer 14 includes a gate 141. The first common electrode 12 and the first metal layer 14 are arranged in the same layer.

In some embodiments of the present disclosure, the first common electrode 12 and the first metal layer 14 may be formed by the same process. The materials of the first common electrode 12 and the first metal layer 14 may be a metal or metal oxide. Specifically, the materials used for the first common electrode 12 and the first metal layer 14 may be any one or a combination of silver (Ag), aluminum (Al), nickel (Ni), chromium (Cr), molybdenum (Mo), copper (Cu), tungsten (W), or titanium (Ti). The afore-mentioned metals have good conductivity and low cost, so that the production cost can be reduced while ensuring the conductivity of the first common electrode 12 and the first metal layer 14.

In some other embodiments of the present disclosure, the first common electrode 12 and the first metal layer 14 may be formed by two processes respectively. The material used for the first common electrode 12 may be any one of indium tin oxide (ITO), indium zinc oxide (IZO), indium aluminum zinc oxide (IAZO), indium gallium tin oxide (IGTO), or antimony tin oxide (ATO). The above-mentioned transparent metal oxide materials have good conductivity and transparency, and can increase the aperture ratio of the touch display panel 100.

In the present disclosure, the first substrate 10 further includes a gate insulating layer 151, an active layer 16 and a second metal layer 17 stacked on the first metal layer 14 in sequence. The second metal layer 17 includes a source 171 and a drain 172. The touch wiring 13 and the second metal layer 17 are arranged in the same layer.

The materials of the touch wiring 13 and the second metal layer 17 may also be any one of the above-mentioned metals or metal oxides, which will not be repeated here. In addition, the materials of the touch wiring 13 and the second metal layer 17 may be the same or different.

The material of the active layer 16 may be monocrystalline silicon, indium gallium zinc oxide, indium gallium tin oxide, low-temperature polysilicon, or the like. The material of the active layer 16 may be selected depending on the requirements on the performance of the touch display panel 100.

Further, the first substrate 10 further includes a passivation layer 152 and a pixel electrode layer 18. The pixel electrode layer 18 includes a pixel electrode 43 and a connection wiring 182. The pixel electrode 43 is connected to the drain 172 through a connection via hole (not shown in the figure). The passivation layer 152 includes a first via hole 152A and a second via hole 152B. The first via hole 152A is formed through the passivation layer 152 and the gate insulating layer 151 and exposes a side surface of the first common electrode 12 away from the first base 11. The second via hole 152B is formed through the passivation layer 152 and exposes a side surface of the touch wiring 13 away from the first base 11. The connection wiring 182 connects the first common electrode 12 and the touch wiring 13 together through the first via hole 152A and the second via hole 152B.

In the present disclosure, by arranging the touch wiring 13 and the second metal layer 17 in the same layer, the thickness of the touch display panel 100 can be further reduced. The second metal layer 17 may include the touch wiring 13. Alternatively, the touch wiring 13 may be formed by patterning another conductive layer.

In addition, because the touch wiring 13 and the second metal layer 17 are arranged in the same layer, the first via hole 152A and the second via hole 152B can be formed by the same process during the formation of connection via holes between the pixel electrode 43 and the drain 172. Therefore, the number of masks is reduced and the process is simplified.

It should be noted that the structure of the thin film transistor formed in the first substrate 10 is not limited in the present disclosure, and the structure shown in the figures is merely an example. The thin film transistor may be a top-gate thin film transistor, a bottom-gate thin film transistor, a dual-gate thin film transistor, or a single-gate thin film transistor. The specific structure of the thin film transistor will not be described in detail in the present disclosure.

In the present disclosure, the second substrate 20 further includes a black matrix 23 and a color resist layer 24. The color resist layer 24 includes, but is not limited to, a red photoresist 241, a green photoresist 242, and a blue photoresist 243. The black matrix 23 is located between neighboring color photoresists to avoid crosstalk.

It should be noted that in this embodiment, the color resist layer 24 is located on the second substrate 20. That is to say, the touch display panel 100 has a Non-Color-filter on Array (Non-COA) structure. However, this should not be construed as a limitation to the present disclosure. In some other embodiments of the present disclosure, the color resist layer 24 may be arranged in the first substrate 10. That is to say, the touch display panel 100 may have a Color-filter on Array (COA) structure. The COA technology is an integrated technology in which the color photoresist layer is directly fabricated on the array substrate, which can effectively solve the problems such as light leakage caused by the alignment deviation in the cell assembly process of the touch display panel 100, and can significantly improve the display aperture ratio.

Figure 2:
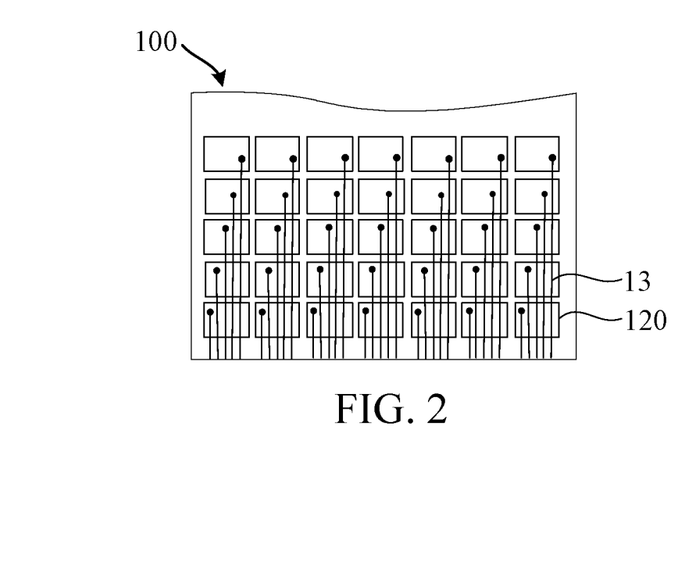
FIG. 2 is a schematic structural plane view of the touch display panel according to the first embodiment of the present disclosure.
Figure 3:
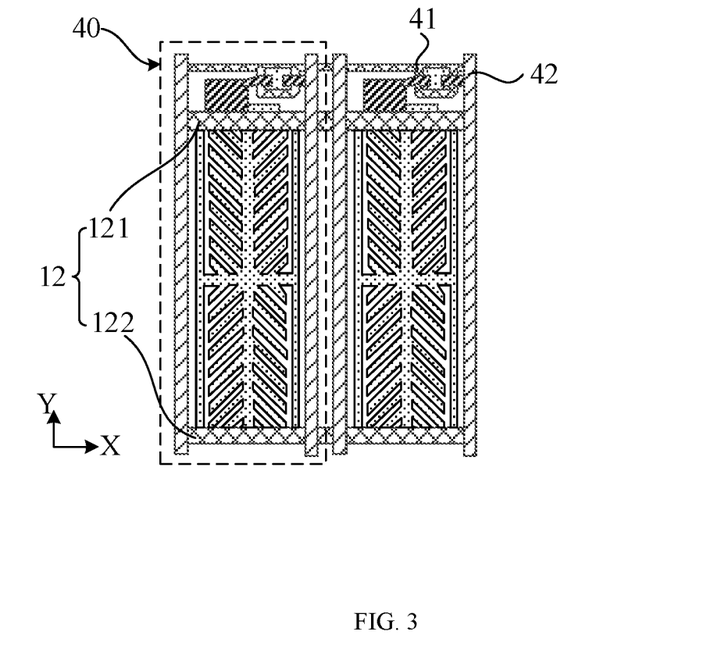
FIG. 3 is a first schematic structural diagram of a sub-pixel of the touch display panel according to the first embodiment of the present disclosure.
Figure 4:
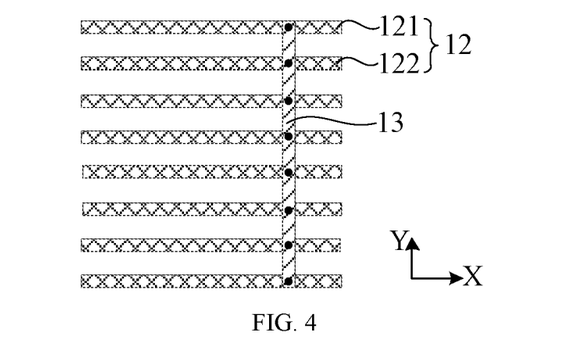
FIG. 4 is a first schematic structural diagram of a touch electrode and a touch wiring of the touch display panel according to the first embodiment of the present disclosure.

Refer to FIG. 2 to FIG. 4. FIG. 2 is a schematic structural plane view of the touch display panel according to the first embodiment of the present disclosure. FIG. 3 is a first schematic structural diagram of a sub-pixel of the touch display panel according to the first embodiment of the present disclosure. FIG. 4 is a first schematic structural diagram of a touch electrode and a touch wiring of the touch display panel according to the first embodiment of the present disclosure.

In the present disclosure, the touch display panel 100 includes scan lines 41, data lines 42 and sub-pixels 40 defined by the intersection of the scan lines 41 and the data lines 42. Each sub-pixel 40 includes a pixel electrode 43. In a first direction Y, each pixel electrode 43 includes a first end 43A and a second end 43B arranged opposite to each other. The first common electrode 12 includes a first sub-electrode 121 and a second sub-electrode 122. Both the first sub-electrode 121 and the second sub-electrode 122 extend along a second direction X. The second direction X perpendicularly intersects the first direction Y, but the present disclosure is not limited thereto. The first sub-electrode 121 is arranged corresponding to the first ends 43A of a plurality of pixel electrodes 43. The second sub-electrode 122 is arranged corresponding to the second ends 43B of a plurality of pixel electrodes 43. That is to say, a plurality of sub-pixels 40 share the same common electrode 12. In the first direction Y, a plurality of adjacent first common electrodes 12 are connected to the same touch wiring 13.

It can be understood that in order to increase the aperture ratio of the touch display panel 100, the size of the first common electrode 12 is small. In this embodiment, a plurality of adjacent first common electrodes 12 are connected to the same touch wiring 13, so that one touch electrode 120 includes a plurality of first common electrodes 12. Therefore, the sensing area of the touch electrode 120 can be increased, and the touch signal-to-noise ratio and sensitivity of the touch display panel 100 can be improved.

The planar structure of the touch electrode 120 may be rectangular, but the present disclosure is not limited thereto. When the planar structure of the touch electrode 120 is rectangular, the side length of the touch electrode 120 is in a range of 2 mm to 9 mm. For example, the length of a first side length of the touch electrode 120 is 2 mm, and the length of a second side length of the touch electrode 120 is 2 mm; the length of the first side length of the touch electrode 120 is 6 mm, and the length of the second side length of the touch electrode 120 is 9 mm; or the length of the first side length of the touch electrode 120 is 9 mm, and the length of the second side length of the touch electrode 120 is 9 mm.

Figure 5:
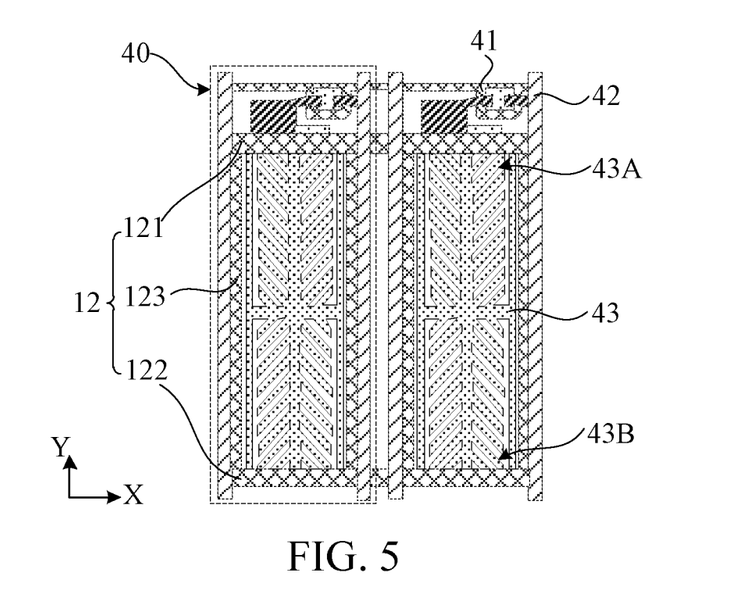
FIG. 5 is a second schematic structural diagram of a sub-pixel of the touch display panel according to the first embodiment of the present disclosure.
Figure 6:
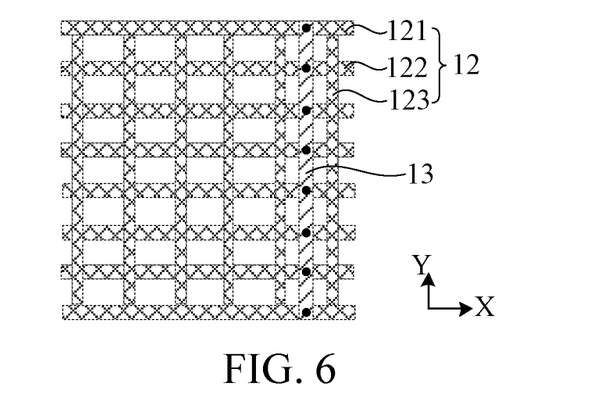
FIG. 6 is a second schematic structural diagram of a touch electrode and a touch wiring of the touch display panel according to the first embodiment of the present disclosure.

Refer to FIG. 2, FIG. 5 and FIG. 6. FIG. 5 is a second schematic structural diagram of a sub-pixel of the touch display panel according to the first embodiment of the present disclosure. FIG. 6 is a first schematic structural diagram of a touch electrode and a touch wiring of the touch display panel according to the first embodiment of the present disclosure.

Different from the sub-pixel 40 shown in FIG. 3, in this embodiment, the first common electrode 12 further includes at least one third sub-electrode 123. The third sub-electrode 123 extends along the first direction Y and is staggered from the pixel electrode 43. One end of the third sub-electrode 123 is connected to the first sub-electrode 121. An other end of the third sub-electrode 123 is connected to the second sub-electrode 122. In the first direction Y, a plurality of adjacent first common electrodes 12 are connected to the same touch wiring 13.

In each of the first common electrodes 12, the number of third sub-electrodes 123 may be one, two or more. This embodiment is described through an example where the first common electrode 12 includes two third sub-electrodes 123, but it should not be construed as a limitation to the present disclosure.

The third sub-electrode 123 may be arranged between the data line 42 and the pixel electrode 43. Alternatively, the third sub-electrode 123 may be arranged to overlap the data line 42. Alternatively, the third sub-electrode 123 may be arranged to overlap the pixel electrode 43.

This embodiment further increases the area of the first common electrode 12, thereby increasing the sensing area of the touch electrode 120, which is beneficial to improving the touch sensitivity. In addition, because the third sub-electrode 123 is staggered from the pixel electrode 43, the pixel aperture ratio is not affected.

Figure 7:
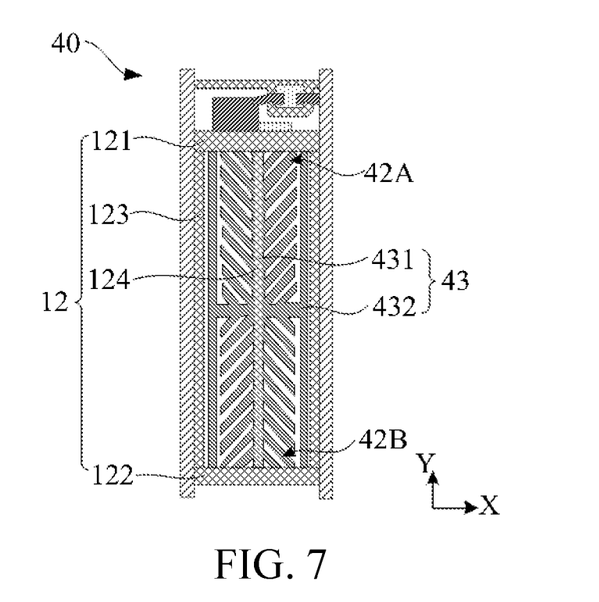
FIG. 7 is a third schematic structural diagram of a sub-pixel of the touch display panel according to the first embodiment of the present disclosure.
Figure 8:
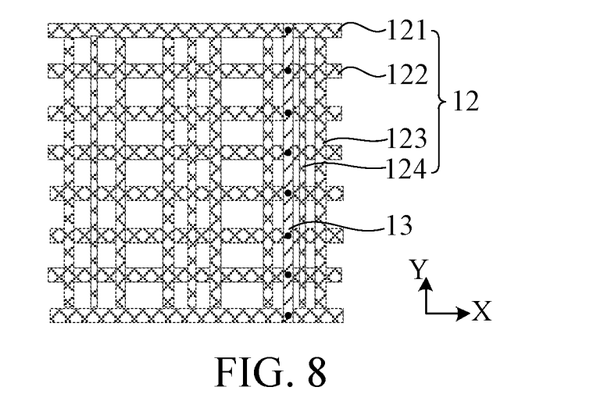
FIG. 8 is a third schematic structural diagram of a touch electrode and a touch wiring of the touch display panel according to the first embodiment of the present disclosure.

Further, refer to FIG. 2, FIG. 7 and FIG. 8. FIG. 7 is a third schematic structural diagram of a sub-pixel of the touch display panel according to the first embodiment of the present disclosure. FIG. 8 is a first schematic structural diagram of a touch electrode and a touch wiring of the touch display panel according to the first embodiment of the present disclosure.

Different from the sub-pixel 40 shown in FIG. 5, in this embodiment, the first common electrode 12 further includes a fourth sub-electrode 124. The pixel electrode 43 includes a first stem portion 431 and a second stem portion 432. The first stem portion 431 extends along the first direction Y. The second stem portion 432 extends along the second direction X. The fourth sub-electrode 124 is arranged corresponding to the first main portion 431, i.e., the fourth sub-electrode 124 is arranged to overlap the first main portion 431. One end of the fourth sub-electrode 124 is connected to the first sub-electrode 121. An other end of the fourth sub-electrode 124 is connected to the second sub-electrode 122.

Figure 9:
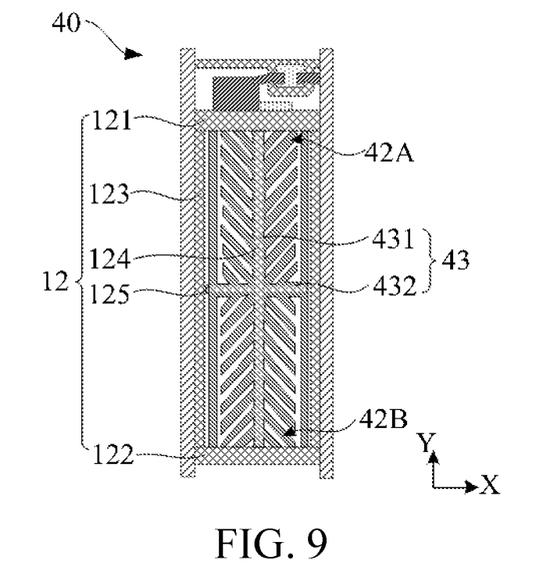
FIG. 9 is a fourth schematic structural diagram of a sub-pixel of the touch display panel according to the first embodiment of the present disclosure.
Figure 10:
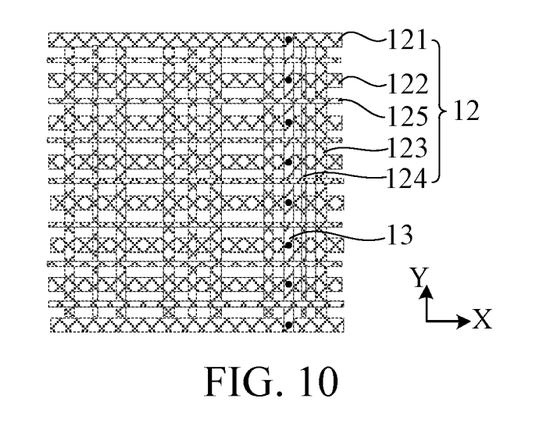
FIG. 10 is a first schematic structural diagram of a touch electrode and a touch wiring of the touch display panel according to the first embodiment of the present disclosure.

Further, refer to FIG. 9 and FIG. 10. FIG. 9 is a fourth schematic structural diagram of a sub-pixel of the touch display panel according to the first embodiment of the present disclosure. FIG. 10 is a first schematic structural diagram of a touch electrode and a touch wiring of the touch display panel according to the first embodiment of the present disclosure. Different from the sub-pixel 40 shown in FIG. 7, in this embodiment, the first common electrode 12 further includes a fifth sub-electrode 125. The fifth sub-electrode 125 is arranged corresponding to the second main portion 432. The fifth sub-electrode 125 and the fourth sub-electrode 124 are cross-connected to each other. Alternatively, one end of the fifth sub-electrode 125 is connected to one third sub-electrode 123. an other end of the fifth sub-electrode 125 is connected to another third sub-electrode 123.

It can be understood that the first stem portion 431 and the second stem portion 432 are located at the junction of different domains in the pixel electrode 43, and liquid crystals located at the junction are not controlled by the electric field and present a normally dark state. Therefore, by arranging the fourth sub-electrode 124 corresponding to the first main stem 431 and/or arranging the fifth sub-electrode 125 corresponding to the second main stem 432, not only the sensing area of the touch electrode is increased, but also the pixel aperture ratio is not affected by the fourth sub-electrode 124 and the fifth sub-electrode 125.

It should be noted that in some other embodiments of the present disclosure, the first common electrode 12 may also include only the first sub-electrode 121, the second sub-electrode 122, the fourth sub-electrode 124, and the fifth sub-electrode 125. Alternatively, the first common electrode 12 includes only the first sub-electrode 121, the second sub-electrode 122, and the fifth sub-electrode 125. This is not particularly limited in the present disclosure.

Figure 11:
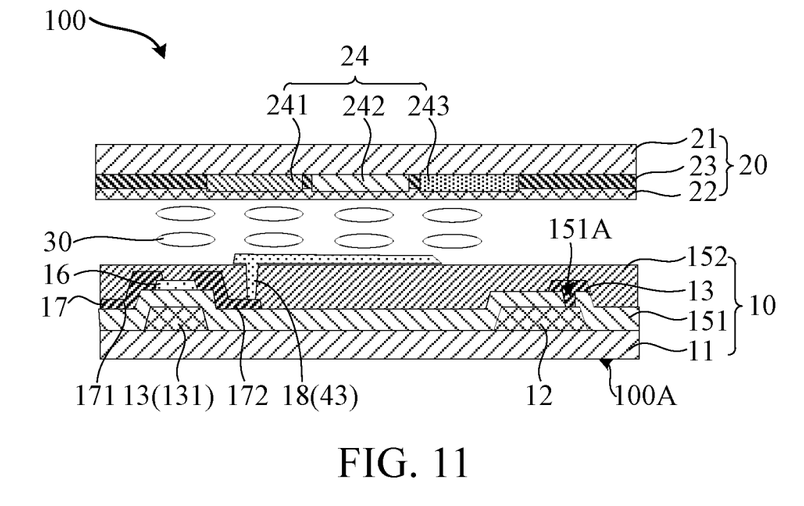
FIG. 11 is a schematic structural diagram of a touch display panel according to a second embodiment of the present disclosure.

Referring to FIG. 11, FIG. 11 is a schematic structural diagram of a touch display panel according to a second embodiment of the present disclosure. Different from the touch display panel 100 in the first embodiment, in this embodiment, the gate insulating layer 151 includes a third via hole 151A. The third via hole 151A is formed through the gate insulating layer 151 and exposes a side surface of the first common electrode 12 away from the first base 11. The touch wiring 13 is connected to the first common electrode 12 through the third via hole 151A.

In this embodiment, the touch wiring 13 is directly connected to the first common electrode 12 through the third via hole 151A, and the connection wiring 182 in the first embodiment does not need to be additionally provided. In this way, the connection resistance between the touch wiring 13 and the first common electrode 12 can be reduced, thereby improving the touch sensitivity. In addition, in this embodiment, only one third via hole 151A is required to realize the connection between the touch wiring 13 and the first common electrode 12, which can effectively reduce the probability of poor contact.

Figure 12:
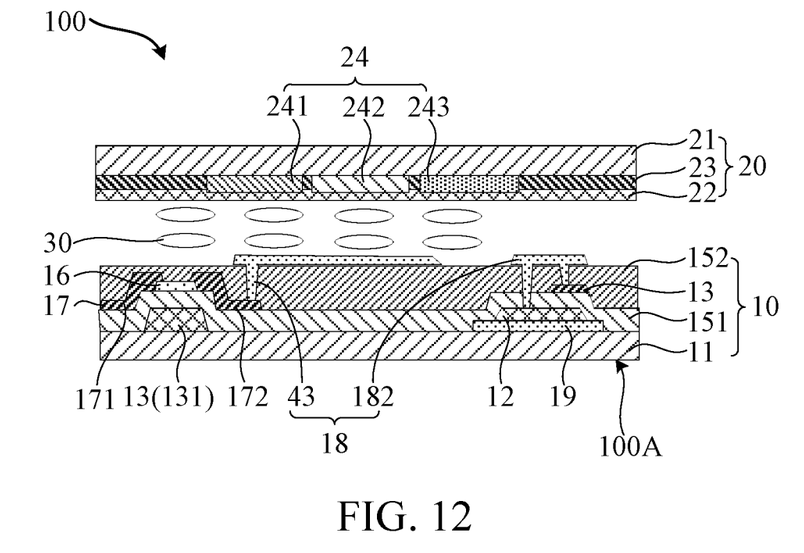
FIG. 12 is a schematic structural diagram of a touch display panel according to a third embodiment of the present disclosure.

Referring to FIG. 12, FIG. 12 is a schematic structural diagram of a touch display panel according to a third embodiment of the present disclosure. In this embodiment, the first substrate 10 includes a transparent auxiliary electrode 19. The transparent auxiliary electrode 19 is arranged corresponding to the first common electrode 12 and is in contact with the corresponding first common electrode 12.

The material used for the transparent auxiliary electrode 19 may also be any one or a combination of more than one of transparent conductive materials such as indium tin oxide, indium zinc oxide, indium aluminum zinc oxide, indium gallium tin oxide, antimony tin oxide (ATO), or carbon nanotubes.

It can be understood that when the first common electrode 12 is made of a non-transparent conductive metal, the size of the first common electrode 12 is small so as not to affect the aperture ratio of the touch display panel 100. Therefore, in this embodiment, by arranging the transparent auxiliary electrode 19, the sensing area of the touch electrode can be increased and the touch sensitivity can be improved without affecting the aperture ratio.

The transparent auxiliary electrode 19 may be arranged on one side of the first common electrode 12 close to the first base 11. Alternatively, the transparent auxiliary electrode 19 may be arranged on one side of the first common electrode 12 away from the first base 11. Alternatively, the transparent auxiliary electrode 19 may be arranged in the same layer as the first common electrode 12. This is not particularly limited in the present disclosure.

For example, in this embodiment, the transparent auxiliary electrode 19 is located between the first common electrode 12 and the first base 11. An orthographic projection of the first common electrode 12 on the first base 11 is located within an orthographic projection of the transparent auxiliary electrode 19 on the first base 11. Therefore, the first common electrode 12 and the transparent auxiliary electrode 19 are arranged in parallel, which can reduce the resistance and further improve the touch sensitivity.

Figure 13:
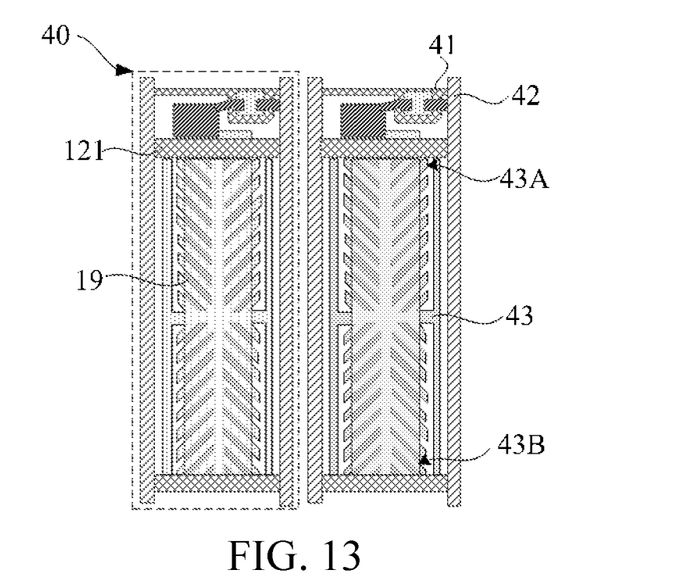
FIG. 13 is a schematic structural diagram of a sub-pixel of the touch display panel according to the third embodiment of the present disclosure.
Figure 14:
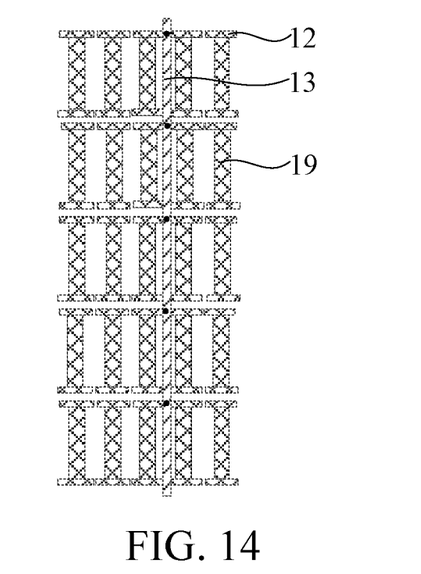
FIG. 14 is a schematic structural diagram of a touch electrode and a touch wiring of the touch display panel according to the third embodiment of the present disclosure.

Refer to FIG. 2, FIG. 13, and FIG. 14. FIG. 13 is a schematic structural diagram of a sub-pixel of the touch display panel according to the third embodiment of the present disclosure; FIG. 14 is a schematic structural diagram of a touch electrode and a touch wiring of the touch display panel according to the third embodiment of the present disclosure. In this embodiment, each of the sub-pixels 40 includes a pixel electrode 43 and two first common electrodes 12 spaced apart from each other. That is to say, in each sub-pixel 40, two mutually independent first common electrodes 12 are arranged. The first common electrodes 12 of adjacent sub-pixels are also independent of each other.

In the first direction Y, each pixel electrode 43 includes a first end 43A and a second end 43B arranged opposite to each other. One of the first common electrodes 12 is arranged corresponding to the first end 43A. The other first common electrode 12 is arranged corresponding to the second end 43B. The two first common electrodes 12 are connected by the transparent auxiliary electrode 19.

Each touch electrode 120 includes a plurality of first common electrodes 12. In the first direction Y, a plurality of first common electrodes 12 are connected to the same touch wiring 13. In the second direction X, every two adjacent first common electrodes 12 are connected to the same touch wiring 13.

It can be understood that in this embodiment, the transparent auxiliary electrode 19 increases the sensing area of the touch electrode 120. Therefore, there is no need to improve the structure of the first common electrode 12, i.e., there is no need to increase the area of the first common electrode 12. Therefore, the aperture ratio of the touch display panel 100 is not affected.

It should be noted that in this embodiment, two adjacent columns of first common electrodes 12 constitute one touch electrode 120. In some other embodiments, a plurality of first common electrodes 12 in the same column may be configured as one touch electrode 120. The configuration of the touch electrode 120 may be set depending on the requirement on the touch sensitivity of the touch display panel 100.

In addition, in the present disclosure, on the basis of the arrangement of the transparent auxiliary electrode 19, the structure of the first common electrode 12 may also be improved as described in the solutions of the first embodiment and the second embodiment, to further increase the sensing area of the touch electrode. The specific embodiments given in the present disclosure should not be construed as a limitation to the present disclosure.

Correspondingly, the present disclosure also provides a display device, including a touch display panel and a backlight module. The backlight module is arranged on one side of the second substrate away from the first substrate to provide a backlight source to the touch display panel, so that the touch display panel can display normally. The touch display panel is the touch display panel described in any of the foregoing embodiments. Reference may be made to the above-mentioned content for details, which will not be repeated here.

Figure 15:
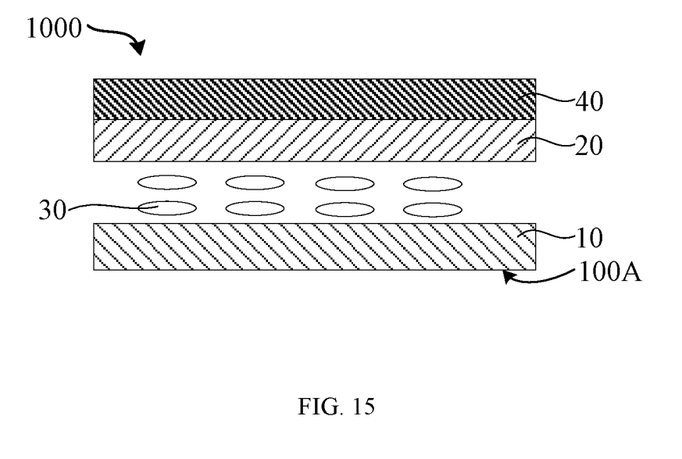
FIG. 15 is a schematic structural diagram of a display device according to the present disclosure.

Specifically, referring to FIG. 15, FIG. 15 is a schematic structural diagram of a display device according to the present disclosure. The display device 1000 includes a first substrate 10, a second substrate 20, a liquid crystal layer 30, and a backlight module 40. The first substrate 10 is arranged opposite to the second substrate 20. The liquid crystal layer 30 is located between the first substrate 10 and the second substrate 20. The backlight module 40 is arranged on one side of the second substrate 20 away from the first substrate 10. One surface of the first substrate 10 away from the second substrate 20 is a display surface 100A.

Figure 16:
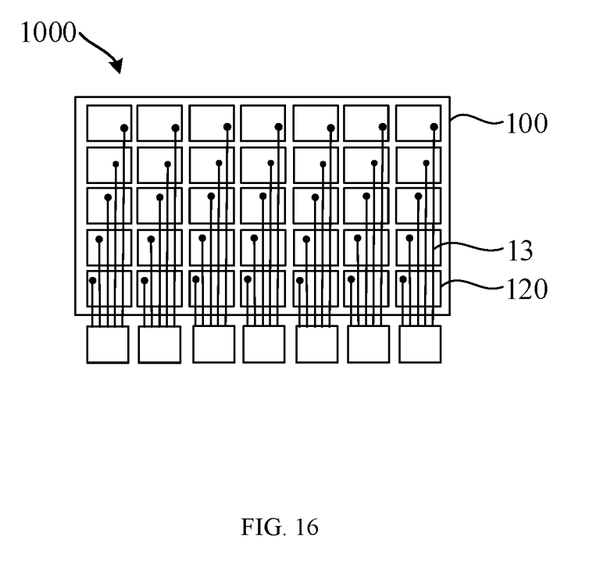
FIG. 16 is a schematic structural plane view of a display device according to the present disclosure.

Further, referring to FIG. 16, FIG. 16 is a schematic structural plane view of a display device according to the present disclosure. The display device 1000 further includes a Touch and Display Driver Integration (TDDI) chip. The touch electrodes 120 are connected to the TDDI chip through the touch wirings 13 to receive a touch driving signal and output a touch signal. In addition, data lines (not shown in the figure) are also connected to the TDDI chip to transmit a data signal to the touch display panel 100.

In the present disclosure, with the use of the highly integrated TDDI chip in the display device 1000, time-sharing processing can be adopted for display and touch control, thereby effectively solving the problem of signal crosstalk between display and touch control.

The present disclosure provides a display device 1000. The display device 1000 includes a touch display panel 100. In the touch display panel 100, by configuring the side of the first substrate 10 away from the second substrate 20 as the display surface 100A, the shielding interference on the first common electrode 12 caused by the second common electrode 22 arranged on the entire surface during touch sensing can be avoided, thereby improving the touch signal-to-noise ratio and sensitivity. In addition, in the present disclosure, by reusing the first common electrode 12 as the touch electrode 120 so as to integrate the touch electrode in the touch display panel 100, the thickness of the touch display panel 100 can be reduced.

The touch display panel and the display device provided in the embodiments of the present disclosure are described in detail above. The principles and implementations of the present disclosure are described by using specific examples in this specification, and the descriptions of the embodiments are merely intended to help understand the methods and core ideas of the present disclosure. Meanwhile, a person skilled in the art may make modifications to the specific implementations and application scopes according to the ideas of the present disclosure. In conclusion, the content of this specification should not be construed as a limitation to the present disclosure.

What is claimed is:

1. A touch display panel, comprising:
a first substrate, wherein the first substrate comprises a first base and a plurality of first common electrodes, the plurality of first common electrodes are arranged on the first base, and at least one of the plurality of first common electrodes is reused as a touch electrode;
a second substrate, arranged opposite to the first substrate, wherein the second substrate comprises a second base and a second common electrode, and the second common electrode is arranged over an entire surface of one side of the second base close to the first base; and
a liquid crystal layer, located between the first substrate and the second substrate,
wherein one surface of the first substrate away from the second substrate is a display surface, and the touch display panel is a vertical alignment (VA) touch display panel;
wherein the first substrate further comprises a plurality of touch wirings, the plurality of touch wirings and the plurality of first common electrodes are located in different layers, and each of the plurality of touch wirings and a corresponding first common electrode of the plurality of first common electrodes are connected through a via hole;
wherein the first substrate further comprises a first metal layer, the first metal layer is arranged on one side of the first base close to the second base, the first metal layer comprises a gate, and the plurality of first common electrodes are arranged in a same layer as the first metal layer;
wherein the first substrate further comprises a gate insulating layer, an active layer, and a second metal layer stacked on the first metal layer in sequence; and
the second metal layer comprises a source and a drain, and the plurality of touch wirings are arranged in a same layer as the second metal layer;
wherein the first substrate further comprises a passivation layer and a pixel electrode layer; and
the pixel electrode layer comprises a plurality of pixel electrodes and a plurality of connection wirings, the passivation layer comprises a first via hole and a second via hole, the first via hole is formed through the passivation layer and the gate insulating layer and exposes a side surface of at least one of the plurality of first common electrodes away from the first base, the second via hole is formed through the passivation layer and exposes a side surface of at least one of the plurality of touch wirings away from the first base, and each of the plurality of connection wirings connects the at least one of the plurality of first common electrodes and the at least one of the plurality of touch wirings together through the first via hole and the second via hole.

2. The touch display panel as claimed in claim 1, wherein the touch display panel comprises a plurality of sub-pixels, each of the plurality of sub-pixels comprises a pixel electrode, and in a first direction, each pixel electrode comprises a first end and a second end arranged opposite to each other;
each of the plurality of first common electrodes comprises a first sub-electrode and a second sub-electrode, both the first sub-electrode and the second sub-electrode extend in a second direction, the second direction intersects the first direction, the first sub-electrode is arranged corresponding to the first end, and the second sub-electrode is arranged corresponding to the second end; and
in the second direction, a plurality of adjacent sub-pixels of the plurality of sub-pixels share a same first common electrode of the plurality of first common electrodes, and in the first direction, multiple adjacent first common electrodes of the plurality of first common electrodes are connected to a same touch wiring of the plurality of touch wirings.

3. The touch display panel as claimed in claim 2, wherein each of the plurality of first common electrodes further comprises at least one third sub-electrode, the at least one third sub-electrode extends along the first direction and is staggered from the pixel electrode, one end of each of the at least one third sub-electrode is connected to the first sub-electrode, and another end of each of the at least one third sub-electrode is connected to the second sub-electrode.

4. The touch display panel as claimed in claim 2, wherein each of the plurality of first common electrodes further comprises a fourth sub-electrode and a fifth sub-electrode; and
the pixel electrode comprises a first stem portion and a second stem portion, the first stem portion extends along the first direction, the second stem portion extends along the second direction, the fourth sub-electrode is arranged corresponding to the first stem portion, and the fifth sub-electrode is arranged corresponding to the second stem portion.

5. The touch display panel as claimed in claim 1, wherein the first substrate further comprises a plurality of transparent auxiliary electrodes, and each of the plurality of transparent auxiliary electrodes is connected to corresponding first common electrodes of the plurality of first common electrodes.

6. The touch display panel as claimed in claim 5, wherein the plurality of transparent auxiliary electrodes are located between the plurality of first common electrodes and the first base, and an orthographic projection of each of the plurality of first common electrodes on the first base is located within an orthographic projection of each of the plurality of transparent auxiliary electrodes on the first base.

7. The touch display panel as claimed in claim 5, wherein the plurality of transparent auxiliary electrodes and the plurality of first common electrodes are arranged in a same layer.

8. The touch display panel as claimed in claim 5, wherein the touch display panel comprises a plurality of sub-pixels, each of the plurality of sub-pixels comprises a pixel electrode and two first common electrodes of the plurality of first common electrodes spaced apart from each other; and
in a first direction, each pixel electrode comprises a first end and a second end arranged opposite to each other, wherein one of the two first common electrodes is arranged corresponding to the first end, another one of the two first common electrodes is arranged corresponding to the second end, and the two first common electrodes are connected by each of the plurality of transparent auxiliary electrodes.

9. The touch display panel as claimed in claim 8, wherein multiple first common electrodes of the plurality of first common electrodes are connected to a same touch wiring of the plurality of touch wirings in the first direction, every two adjacent first common electrodes of the plurality of the first common electrodes are connected to a same touch wiring of the plurality of touch wirings in the second direction, and the second direction intersects the first direction.

10. The touch display panel as claimed in claim 1, wherein a planar structure of the touch electrode is rectangular, the touch electrode has a first side length and a second side length, and the first side length and the second side length both range from 2 mm to 9 mm.

11. The touch display panel as claimed in claim 1, wherein the touch display panel comprises a display mode and a touch mode; and
when the touch display panel is in the display mode, at least one of the plurality of first common electrodes is connected to a common electrode driving signal, and when the touch display panel is in the touch mode, at least one of the plurality of first common electrodes is connected to a touch driving signal.

12. A display device, comprising a touch display panel and a backlight module, wherein the touch display panel comprises:
a first substrate, wherein the first substrate comprises a first base and a plurality of first common electrodes, the plurality of first common electrodes are arranged on the first base, and at least one of the plurality of first common electrodes is reused as a touch electrode;
a second substrate, arranged opposite to the first substrate, wherein the second substrate comprises a second base and a second common electrode, and the second common electrode is arranged over an entire surface of one side of the second base close to the first base; and
a liquid crystal layer, located between the first substrate and the second substrate,
wherein one surface of the first substrate away from the second substrate is a display surface; and
the backlight module is arranged on one side of the second substrate away from the first substrate, and the touch display panel is a vertical alignment (VA) touch display panel;
wherein the first substrate further comprises a plurality of touch wirings, the plurality of touch wirings and the plurality of first common electrodes are located in different layers, and each of the plurality of touch wirings and a corresponding first common electrode of the plurality of first common electrodes are connected through a via hole;
wherein the first substrate further comprises a first metal layer, the first metal layer is arranged on one side of the first base close to the second base, the first metal layer comprises a gate, and the plurality of first common electrodes are arranged in a same layer as the first metal layer;
wherein the first substrate further comprises a gate insulating layer, an active layer, and a second metal layer stacked on the first metal layer in sequence; and
the second metal layer comprises a source and a drain, and the plurality of touch wirings are arranged in a same layer as the second metal layer;
wherein the first substrate further comprises a passivation layer and a pixel electrode layer; and
the pixel electrode layer comprises a plurality of pixel electrodes and a plurality of connection wirings, the passivation layer comprises a first via hole and a second via hole, the first via hole is formed through the passivation layer and the gate insulating layer and exposes a side surface of at least one of the plurality of first common electrodes away from the first base, the second via hole is formed through the passivation layer and exposes a side surface of at least one of the plurality of touch wirings away from the first base, and each of the plurality of connection wirings connects the at least one of the plurality of first common electrodes and the at least one of the plurality of touch wirings together through the first via hole and the second via hole.

13. The display device as claimed in claim 12, wherein the first substrate further comprises a plurality of transparent auxiliary electrodes, and each of the plurality of transparent auxiliary electrodes is connected to corresponding first common electrodes of the plurality of first common electrodes.

* * * * *